United States Patent [19]

Nagano

[11] Patent Number: 4,618,333
[45] Date of Patent: Oct. 21, 1986

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 735,668

[22] Filed: May 20, 1985

[30] Foreign Application Priority Data

May 26, 1984 [JP] Japan .................. 59-77506[U]

[51] Int. Cl.⁴ .............................................. F16H 9/00
[52] U.S. Cl. ...................................... 474/80; 474/82
[58] Field of Search .................................. 474/80, 82

[56] References Cited

U.S. PATENT DOCUMENTS 4,226,131  10/1980  Yamasaki ........................ 474/82
4,259,873  4/1981   Nagano et al. .................. 474/82
4,348,198  9/1982   Shimano ......................... 474/82

Primary Examiner—James A. Leppink
Assistant Examiner—Frank McKenzie
Attorney, Agent, or Firm—Stevens, Davis, Miller & Mosher

[57] ABSTRACT

A bicycle derailleur is provided which has a pair of linkage members interposed between a base and a movable member. At least one of the linkage members is connected to a least one of the base member and the movable member such that one of (i) the at least one linkage member and (ii) the aforesaid at least one of the base member and the movable member comprises an insertion region having a pair of mounting walls and the other of (i) the at least one linkage member and (ii) the aforesaid at least one of the base member and the movable member comprises an insertion portion inserted between the mounting walls. A link pin is disposed between the mounting walls and passes through the insertion portion. One of (i) both the mounting walls and (ii) opposite surfaces of the insertion portion opposite to the mounting walls includes an annular recess surrounding the link pin. A sealing member is disposed in each annular recess to prevent water, mud, and debris from entering into a space surrounding the link pin.

8 Claims, 4 Drawing Figures

4,618,333

DERAILLEUR FOR A BICYCLE

FIELD OF THE INVENTION

This invention relates to a derailleur for a bicycle, and more particularly to a bicycle derailleur, which is used together with a multistage sprocket assembly to switch a driving chain to a selected sprocket of the sprocket assembly to change the bicycle speed.

BACKGROUND OF THE INVENTION

Generally, bicycle derailleurs are provided with a base member mounted to the bicycle frame, a movable member movable axially of the sprocket assembly, the movable member carrying a chain guide, and a pair of linkage members interposed between the base member and the movable member and supporting the movable member with respect to the base member. Generally, the base member and movable member each have a pair of mounting walls opposite to each and the linkage members are inserted at both of their ends between the mounting walls to be swingable through link pins respectively.

The derailleur constructed as described above is mounted on a seat tube or a rear solid end at the bicycle frame. In either case, each member of the derailleur is exposed to the atmosphere and, during rainy weather, is splashed with rain water or muddy water from the rotating wheel.

The pivotal portions between the insertion portions at each linkage member and the mounting walls at the base member and the movable member have gaps therebetween through which rain water or muddy water may enter into the space around the link pins. Mud or debris may clog the gaps resulting in a resistance against the swinging motion of the linkage members, thus yielding a heavy lever operation for changing the bicycle speed. Also, the sliding portion may be worn out or get rusty due to the muddy water.

SUMMARY OF THE INVENTION

An object of the invention is to provide a derailleur for a bicycle, which, even during rainy weather, prevents rain water or muddy water, especially mud, from entering into the pivotal portions at the linkage members, whereby each linkage member is free from heavy swinging motion and the sliding portion thereof which slides on a link pin is prevented from wearing or getting rusty, resulting in a reliable and light speed-change operation over a long time span.

In a derailleur for a bicycle, which is provided with a base member, a movable member movable with respect thereto, and a pair of linkage members interposed between the base member and the movable member and supporting the movable member, this invention is characterized in that: one of the base member and movable member and each linkage member has a pair of mounting walls; the other member has an insertion portion to be inserted between the mounting walls; a link pin is interposed between the mounting walls and passes through the insertion portion; an annular recess is provided at one of the mounting walls and the insertion; and a sealing member is disposed in the annular recess, thereby restraining water from entering into a space around the link pin through a gap between the mounting walls and the insertion.

The derailleur constructed as above-mentioned, even when splashed with rain water or muddy water in rainy weather, can reliably prevent the water and mud from entering into the space around the link pin through the gap between the mounting walls and the insertion portion. Hence, it is possible to avoid non-smooth swinging motion of the linkage member and prevent the link pin from getting rusty, thereby providing for reliable and light changing of the bicycle speed.

In addition, the sealing member uses an elastic material, such as nitrile rubber, and although the shape of the sealing member is not particularly defined, it preferably has an X-shaped cross section.

Also, the sealing member is used for closing the gaps between the mounting walls and the insertion portion to be inserted therebetween and for closing a gap between the link pin and a pin bore. In either case, the sealing member need only restrain rain water or muddy water from entering the gaps.

These and other objects of the invention will become more apparent from the detailed description and examples which follow.

DETAILED DESCRIPTION OF THE INVENTION

Figure 1:
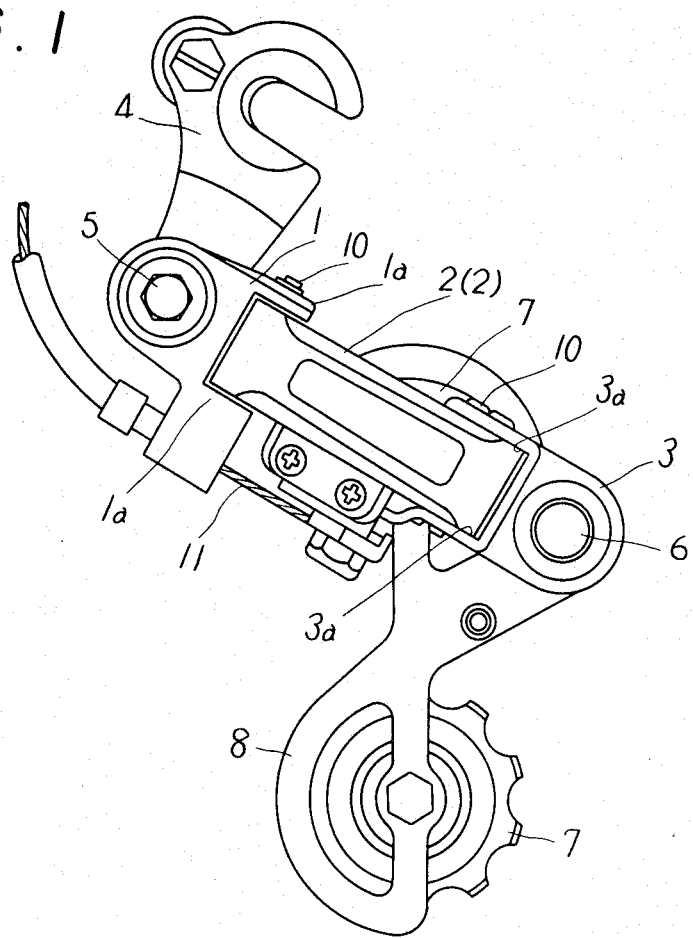
FIG. 1 is a side view of an embodiment of a bicycle derailleur according to the invention.
Figure 2:
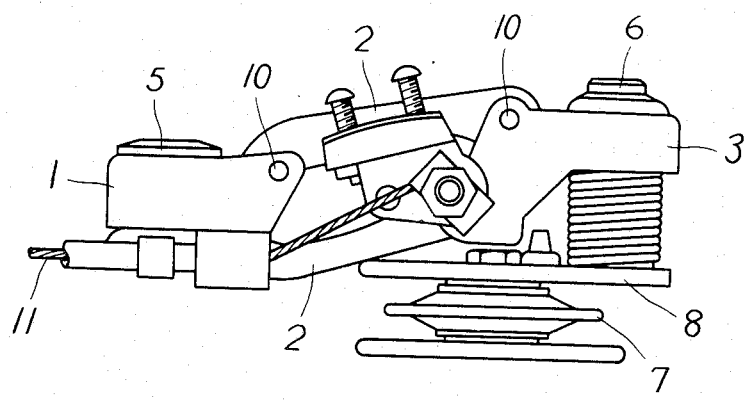
FIG. 2 is a bottom view of the FIG. 1 embodiment.

Referring to FIGS. 1 and 2, a rear derailleur is shown which is used together with the multi-stage sprocket assembly mounted on a rear hub of a bicycle and which basically comprises a base member 1, two parallel linkage members 2, and a movable member 3.

The base member 1 is mounted on a stationary member (not shown), such as a seat stay at the bicycle and is supported swingably to a bracket member 4 through a horizontal shaft 5. Base member 1 is provided at one side with a pair of mounting walls 1a opposite to each other. Movable member 3 is provided at one side with a pair of mounting walls 3a opposite to each other and at its other side with a chain guide 8 which has pulleys 7. Chain guide 8 is supported swingably to the movable member 3 through a shaft 6 extending in the same direction as the horizontal shaft 5.

Each linkage member 2 is formed of, for example, aluminum and is provided at both lengthwise ends with insertion portions having through bores 9 respectively. The insertions are located between the mounting walls 1a or 3a, and link pins 10 are inserted into the through bores 9 respectively, thereby supporting the linkage members 2 swingably to the base member 1 and movable member 3.

A control wire 11 is connected to the linkage member 2 and is pulled or loosened by an operating lever for changing the bicycle speed so that the movable member 3 moves axially of the sprocket assembly (not shown) to switch a driving chain to a selected sprocket at the sprocket assembly.

In the above described derailleur for the bicycle, this invention is characterized by providing a sealing construction between the mounting walls 1a and 3a at the base member 1 and movable member 3 and the insertion portion at the linkage members 2. In detail, annular grooves 14 are formed at the mounting walls or the insertion portion and around the link pins 10, so that sealing members 20 are contained in annular grooves 14 respectively.

Figure 3:
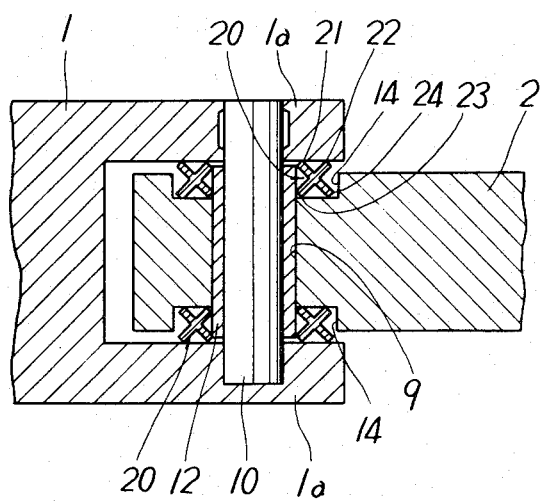
FIG. 3 is an enlarged sectional view of the principal portion of the same.

In the embodiment in FIG. 3, the insertion portion of the linkage member 2 is inserted between the mounting walls 1a at the base member 1. A bushing 12 of length larger than width of the insertion portion is formed of a material having a higher heat resistance than the linkage member 2 and is caulked to the insertion. Link pin 10 is fitted rotatably into the bushing 12. In this condition, the bushing 12 is close at both lengthwise ends to the inner surfaces of mounting walls 1a. The annular recess 14 is formed at each side surface of the insertion portion of linkage member 2 and around the bushing 12, and the sealing member 20 is fitted into the recess 14.

In detail, the sealing member 20 in FIG. 3 is annular, and is composed mainly of nitrile rubber. Sealing member 20 is X-like-shaped in section, which has a pair of first edges 21 and 22 different in diameter and a pair of second edges 23 and 24 different in diameter and is fitted into the recess 14 such that it is compressed lengthwise of the link pin 10. Thus, first edges 21 and 22 come into elastic contact with the inner surface of the mounting wall 1a and the second edges 23 and 24 make elastic contact with the bottom of recess 14.

A sectional width of sealing member 20, i.e., a width in a radial direction between the smaller diameter edge 21 and the larger diameter edge 22 and that between the edges 23 and 24, are smaller than a radial width of recess 14, so that the sealing member 20, when fitted into the recess 14, can be compressed and distorted without changing its elastic contact force against the inner surface of mounting wall 1a and the bottom of recess 14.

The reason for the above is that because the larger the elastic contact force of the sealing member 20, the more resistance is provided against swinging of linkgage member 2, therefore the sealing member 20 is adapted to be given an elastic contact force which is not in excess of the sealing effect.

Thus, the sealing member 20, which is fitted into the recess 14 and in elastic contact at the edges 21, 22, 23 and 24 with the inner surface of mounting wall 1a and the bottom of recess 14, closes a gap between the mounting wall 1a and the insertion of linkage member 2, thereby preventing rain water or muddy water from entering between the link pin 10 and bushing 12 through the gap.

Moreover, the sealing member 20 doubles its sealing effect due to the provisions of edge pairs 21, 22, 23 and 24 in elastic contact with the mounting wall 1a and the bottom of recess 14 after insertion of linkage member 2, thereby reliably preventing muddy water from entering the gap. As a result, the chain guide 8 smoothly moves to reliably change the bicycle speed.

Also, in the FIG. 3 embodiment, the linkage member 2 swings through bushing 12 secured thereto, so that the linkage member 2, even when formed of a light alloy, such an aluminum alloy, will not seize on link pin 10, thereby enabling stable swinging motion over a long time period.

Bushing 12 of length larger than a width of linkage member 2 is close at both its ends to the mounting walls 1a, thereby reducing play on the mounting walls 1a to a minimum. Bushing 12 thus prevents sealing member 20 from being excessively compressed, or from creating a gap between the sealing member 20 and the sealed surface, thereby demonstrating the reliable and stable sealing effect provided by this invention.

Alternatively, bushing 12 may have a smaller length than the width of linkage member 2, and is not indispensable when the linkage member 2 is formed of a heat-resistant material. In this embodiment, a member extending in proximity to the mounting wall 1a from the recess 14 may be integral with the linkage member 2.

Also, the sealing member 20 may alternatively be round or elliptic in section, its shape not being linked to a shape.

Figure 4:
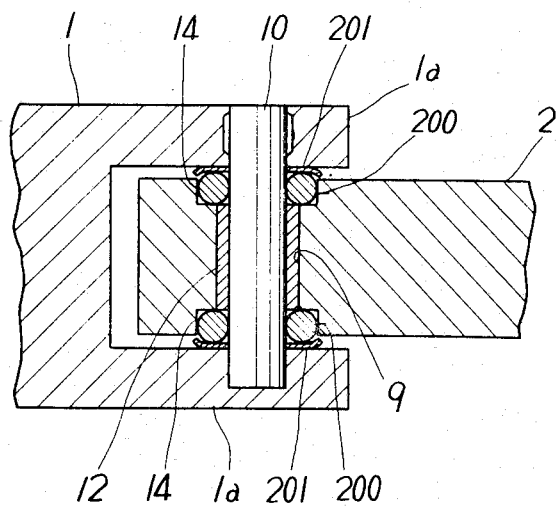
FIG. 4 is an enlarged sectional view of the principal portion of a modified embodiment of the invention, corresponding to FIG. 3.

Alternatively, a sealing member 200, as shown in FIG. 4, is compressed radially of the link pin 10 so as to come into elastic contact with the outer periphery of link pin 10 and the inner periphery of recess 14.

In this FIG. 4 embodiment, the sealing member 200 need not contact the inner surface of mounting wall 1a. Sealing member 200, since it does not contact wall 1a, quite effectively avoids increasing any resistance against swinging motion of linkage member 2.

Also, in an embodiment in which sealing member 200, as shown in FIG. 4, is round in section and is swollen axially when compressed radially of the link pin 10 to thereby contact with the mounting wall 1a, it is preferable to interpose a washer 201 of small frictional resistance between each sealing member 200 and the inner surface of mounting wall 1a.

In addition, in the embodiments of FIGS. 3 and 4, there has been described a connection portion between the base member 1 and one linkage member 2. The connection portions between the movable member 3 and linkage members 2 have a similar construction.

Alternatively, the prevent invention is applicable to a construction wherein a pair of mounting walls are provided at the linkage member 2, with base member 1 or movable member 3 being inserted therein.

Although several embodiments have been described, they are merely exemplary of the invention and not to be construed as limiting, the invention being defined solely by the appended claims.

What is claimed is:

1. A bicycle derailleur, comprising a base member, a movable member, and a pair of linkage members interposed between said base member and said movable member and supporting said movable member such that said movable member is movable with respect to said base member, one of (i) said base member and said movable member and (ii) each of said linkage members having a pair of mounting walls, the other of said base member and said movable member and each of said linkage members comprising an insertion portion inserted between said mounting walls, said mounting walls having therebetween a link pin passing through said insertion portion inserted between said mounting walls, one of each of said mounting walls and a said insertion portion inserted therebetween having annular recesses disposed around said link pin, said annular recesses each having therein a sealing member to restrain water from entering between said mounting wall and said inserting portion into a space around said link pin.

2. A bicycle derailleur according to claim 1, wherein each said sealing member contacts an opposite inner surface of a said mounting wall opposite to a said insertion portion and contacts a bottom portion of a said annular recess.

3. A bicycle derailleur according to claim 2, wherein said sealing member is annular, has an X-shaped cross-section, and includes a pair of first edges in contact with said opposite inner surface of said mounting wall and a pair of second edges in contact with said bottom portion of said annular recess.

4. A bicycle derailleur according to claim 1, wherein said annular recess is open radially inwardly with respect to said link pin, and said sealing member is in contact with an inner periphery of said annular recess and an outer periphery of said link pin.

5. A bicycle derailleur, comprising:
a base member,
a movable member,
a pair of linkage members interconnecting said base member and said movable member such that said movable member is supported movably relative to said base member, at least one of said linkage members being connected to at least one of said base member and said movable member such that one of (i) said at least one linkage member and (ii) said at least one of said base member and said movable member comprises an insertion region having a pair of mounting walls and the other of (i) said at least one linkage member and (ii) said at least one of said base member and said movable member comprises an insertion portion inserted between said mounting walls,
a link pin disposed between said mounting walls and passing through said insertion portion, one of (i) both said mounting walls and (ii) opposite surfaces of said insertion portion opposite to said mounting walls comprising an annular recess around said link pin, and
a sealing member disposed in each annular recess to prevent water, mud and debris from entering into a space around said link pin.

6. A bicycle derailleur according to claim 1, wherein said sealing member contacts an opposite inner surface of said mounting wall opposite to said insertion portion and contacts a bottom portion of said annular recess.

7. A bicycle derailleur according to claim 6, wherein said sealing member is annular, has an X-shaped cross-section, and includes a pair of first edges in contact with said opposite inner surface of said mounting wall and a pair of second edges in contact with said bottom portion of said annular recess.

8. A bicycle derailleur according to claim 5, wherein said annular recess is open radially inwardly with respect to said link pin, and said sealing member is in contact with an inner periphery of said annular recess and an outer periphery of said link pin.

* * * * *